(12) United States Patent
Decoster et al.

(10) Patent No.: US 9,650,000 B2
(45) Date of Patent: May 16, 2017

(54) ELECTRICAL NETWORK FOR A VEHICLE, HAVING AT LEAST ONE COMPONENT THAT CAN BE ACTIVATED

(71) Applicant: Valeo Systemes de Controle Moteur, Cergy Saint Christophe (FR)

(72) Inventors: Sylvain Decoster, Fontenay le Fleury (FR); Thierry Cheng, Les Brevieres (FR); Cyrille Corniglion, Ermont (FR); Raymond Rechdan, Villecresnes (FR); Sylvain Delion, Paris (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 449 days.

(21) Appl. No.: 14/350,226

(22) PCT Filed: Oct. 5, 2012

(86) PCT No.: PCT/FR2012/052266
§ 371 (c)(1),
(2) Date: Apr. 7, 2014

(87) PCT Pub. No.: WO2013/050720
PCT Pub. Date: Apr. 11, 2013

(65) Prior Publication Data
US 2014/0252852 A1 Sep. 11, 2014

(30) Foreign Application Priority Data
Oct. 5, 2011 (FR) ...................................... 11 58984

(51) Int. Cl.
*B60R 16/033* (2006.01)
*H02J 1/10* (2006.01)
(Continued)

(52) U.S. Cl.
CPC ............ *B60R 16/03* (2013.01); *B60R 16/033* (2013.01); *H02J 1/08* (2013.01); *H02J 1/102* (2013.01);
(Continued)

(58) Field of Classification Search
CPC ... B60R 16/03; B60R 16/0315; B60R 16/033; B60R 16/04; H02J 1/08; H02J 1/10;
(Continued)

(56) References Cited

U.S. PATENT DOCUMENTS 3,949,289 A * 4/1976 Day ..................... F02N 11/0866
307/10.7
4,090,122 A * 5/1978 Hoinski ................ H02J 7/1423
320/125
(Continued)

FOREIGN PATENT DOCUMENTS

EP 1 376 812 A2 1/2004
JP 2005132190 A 5/2005
(Continued)

OTHER PUBLICATIONS

International Search Report for corresponding International Application No. PCT/FR2012/052266, mailed Nov. 22, 2012 (2 pages).
(Continued)

*Primary Examiner* — Levi Gannon
(74) *Attorney, Agent, or Firm* — Osha Liang LLP

(57) ABSTRACT

The invention relates to an electrical network (1) for a vehicle, comprising: a first circuit (2) comprising a first power source (7) and at least one first electronic component (8) powered by the first power source (7); and a second circuit (3) comprising a second power source (10) and at least one second electronic component (11) which can be activated and is powered by the second power source (10). The network (1) also comprises: a connecting member (5)
(Continued)

Figure 1:
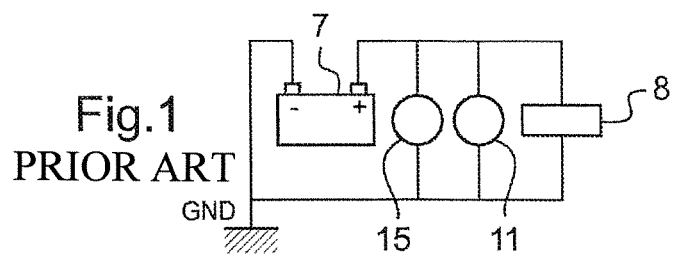

between the first (2) and second (3) circuits, said connecting member (5) allowing, in a first configuration, an exchange of current of a first value between the first circuit (2) and the second circuit (3) and, in a second configuration, an exchange of current of a second value between the first circuit (2) and the second circuit (3), in which the second value is lower than the first value; and a control unit (17) which controls the configuration of the connecting member (5).

17 Claims, 2 Drawing Sheets

(51) Int. Cl.
*H02J 7/14* (2006.01)
*B60R 16/03* (2006.01)
*H02J 7/00* (2006.01)
*H02J 1/08* (2006.01)

(52) U.S. Cl.
CPC ............ *H02J 1/108* (2013.01); *H02J 7/0019* (2013.01); *H02J 7/0024* (2013.01); *H02J 7/1423* (2013.01)

(58) Field of Classification Search
CPC ...... H02J 1/102; H02J 1/108; H02J 2001/104; H02J 2001/106; H02J 7/0013; H02J 7/0014; H02J 7/0019; H02J 7/0024; H02J 7/1423
USPC ................................ 307/9.1, 10.1, 10.7, 10.8
See application file for complete search history.

(56) References Cited

U.S. PATENT DOCUMENTS

| | | | | |
|---|---|---|---|---|
| 4,114,082 A | * | 9/1978 | Scheidler | H02J 7/0024 320/117 |
| 4,757,249 A | * | 7/1988 | Farber | H02J 7/1423 307/84 |
| 5,323,102 A | * | 6/1994 | Torii | H02J 7/1423 322/90 |
| 5,418,401 A | * | 5/1995 | Kaneyuki | H02J 7/1423 307/10.1 |
| 5,488,283 A | * | 1/1996 | Dougherty | B60L 11/1855 307/10.1 |
| 5,883,496 A | * | 3/1999 | Esaki | B60L 11/1868 318/139 |
| 6,044,923 A | * | 4/2000 | Reagan | H02J 7/1423 180/291 |
| 6,879,057 B1 | * | 4/2005 | Pinas | B60R 16/0238 307/10.1 |
| 7,336,002 B2 | * | 2/2008 | Kato | F02N 11/0866 307/10.6 |
| 2011/0260544 A1 | * | 10/2011 | Imai | H02J 7/1423 307/66 |

FOREIGN PATENT DOCUMENTS

| | | |
|---|---|---|
| JP | 2010207061 A | 9/2010 |
| JP | 2011051576 A | 3/2011 |
| JP | 05098987 B2 | 12/2012 |
| WO | 2010026715 A1 | 3/2010 |

OTHER PUBLICATIONS

Office Action Issued in Corresponding Japanese Application No. 2014-533972, Dated Aug. 9, 2016 (7 Pages with English Translation).

* cited by examiner

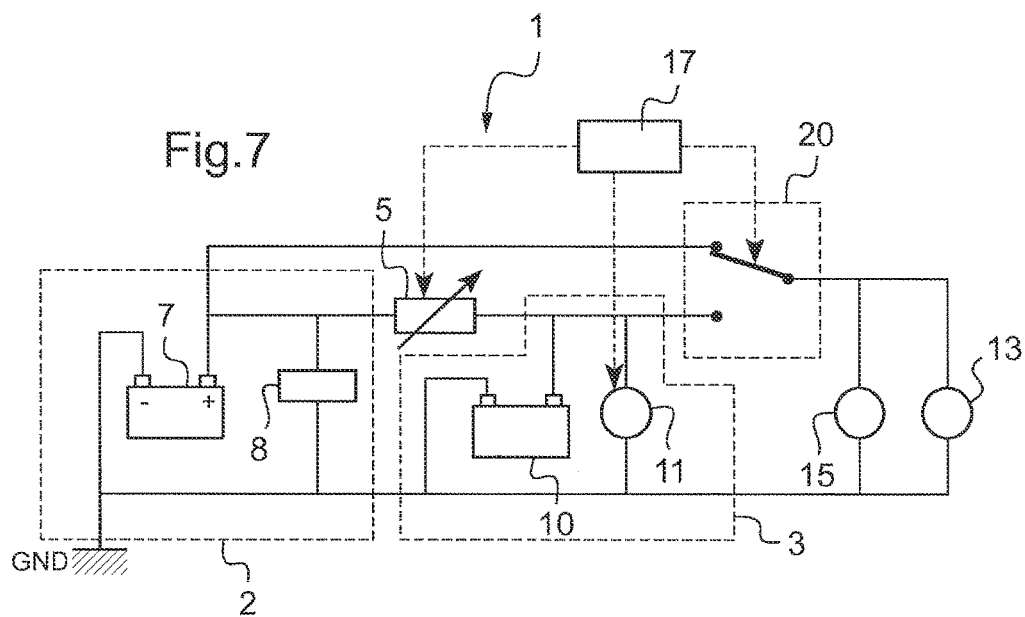
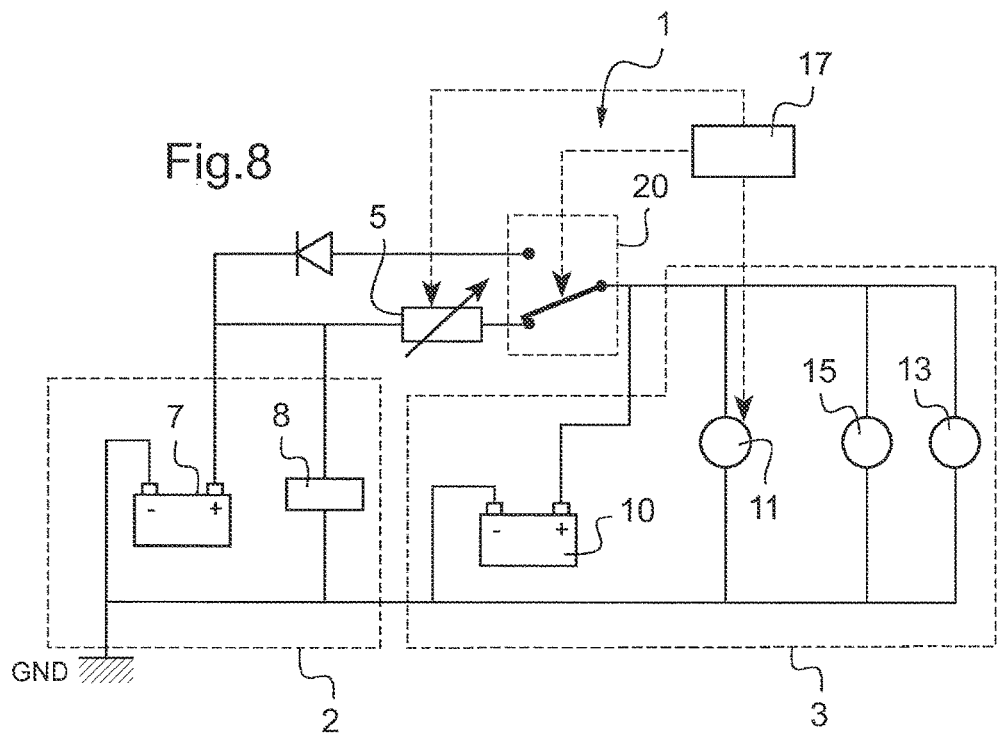

12# ELECTRICAL NETWORK FOR A VEHICLE, HAVING AT LEAST ONE COMPONENT THAT CAN BE ACTIVATED

The present invention relates to an electrical network for a vehicle, the network comprising at least one first electronic component and at least one second electronic component, the second electronic component consuming a greater electrical power, notably very much greater, than that consumed by the first electronic component. The second electronic component can be activated, that is to say that it can operate only intermittently. When it is activated, the second electronic component can absorb current of the order of a few hundred amperes.

The second electronic component is, for example, a compressor configured to deliver air into the intake line of a heat engine. This compressor may be used to back up the turbocharger of the vehicle at low speed and during transient load increases.

The first electronic components are, for example, vehicle safety and/or comfort components, for example headlights, the radio or even the air conditioning installation.

It is known practice to power the first electronic components and the second electronic component of the network by a power source which is a battery. The activation of the second electronic component may pose problems with regard to the operation of the first electronic components, because of the amount of electrical power consumed by the second electronic component. This problem will be illustrated in the case of a network powered by a battery delivering a voltage of 12 V and which comprises first electronic components which require a voltage at least of the order of 6 to 8 V in order to operate.

When the second electronic component is the compressor mentioned above, its activation can alter the properties of the network, because of the difference between the power that it consumes and the power consumed by the first electronic components. A drop in the voltage delivered by the battery, for example a drop of one or more volts, can be caused by the activation of the second electronic component. The voltage delivered by the battery can, consequently, become insufficient for the first electronic components to be powered or, at the very least, to operate nominally, which can pose a safety and/or comfort problem for the user of the vehicle.

To remedy this problem, it has been proposed to power the first electronic components through a voltage-maintaining system such as a DC/DC converter.

The use of such a voltage-maintaining system is costly and its effectiveness is limited by the maximum power that this system can convert. Furthermore, the battery must on its own be sufficient to power the first components and the second electronic component when these components are activated at the same time, which means using a battery of large size.

There is a need to make it possible to have a vehicle electrical network that has at least one first electronic component and at least one second electronic component consuming an electrical power greater than that consumed by the first electronic component, the network making it possible to simultaneously power the first and second components without the operation of these first and second components being affected, and to do so without being too costly.

The invention aims to address the above need and it achieves it, according to one of its aspects, by using an electrical network for a vehicle comprising:

a first circuit comprising a first power source and at least one first electronic component powered by the first power source,
a second circuit comprising a second power source and at least one second electronic component which can be activated and is powered by the second power source, the network also comprising:
a link member between the first and the second circuits, the link member allowing, in a first configuration, an exchange of current of a first value between the first and the second circuits and, in a second configuration, an exchange of current of a second value between the first and the second circuits, the second value being lower than the first value, and
a control unit controlling the configuration of the link member.

Within the meaning of the invention, the first and second current values exchanged are RMS values.

The exchange of current may or may not take place in the same direction when the link member is in the first configuration and when the link member is in the second configuration. When the link member is in the first configuration or in the second configuration, current passes, for example, from the first circuit to the second circuit.

The switchover from the first to the second configuration of the link member, without any other modification of the network, notably with regard to the number of power sources or the power that they deliver, leads to a reduction in the value of the current exchanged through the link member.

The ratio as an absolute value between the first value of the current exchanged between the first and the second circuits in the first configuration and the second value of the current exchanged between the first and the second circuits in the second configuration can be at least two, notably at least three, four, five, even ten.

The above aspect of the invention makes it possible, by using two circuits, to limit as far as possible the disturbances induced by the activation of the second electronic component on the second circuit, such that the operation of the first electronic components is effected very little or not at all by the activation of the second electronic component. The first circuit can be qualified as stabilized circuit and the second circuit as disturbed circuit.

The first power source can be virtually dedicated to the powering of the first electronic components and, when the link member is in the second configuration, because of the reduced or even zero exchange of current between the first and the second circuits, the first electronic components receive a stable voltage of adequate value, ensuring their correct operation.

The ratio between the electrical power consumed by a second electronic component, respectively the electrical power consumed by all the second components, and the electrical power consumed by a first electronic component, respectively the electrical power consumed by all the first components, can be greater than 1, being notably between 1 and 5.

The first electronic components are, for example, comfort and/or safety components, being notably chosen from the following list: headlights or any lighting system, radio, television, GPS system, air conditioning system, ABS, electronic stability control (ESP), audible warning, assisted steering or various computers.

The second electronic component is, for example, a compressor configured to deliver air into the intake line of a heat engine. This compressor backs up, for example, the turbocharger of the vehicle in certain cases. The invention is not however limited to such an exemplary second electronic component and can even be applied to any electronic component that can be activated and that exhibits the above power ratio with respect to the first electronic components.

The power consumed by the second electronic component or by all the second components can be greater than or equal to 1 kW.

According to a first embodiment of the invention, the link member comprises a switch, this switch being closed when the link member is in the first configuration and open when the link member is in the second configuration.

In this example, the second value of the current exchanged between the first and the second circuits is zero when the link member is in the second configuration. In this case, there is a total decoupling between the two circuits when the link member is in the second configuration, such that the operation of the first electronic components is not disturbed by the activation of the second electronic component.

In a particular example, this switch can operate linearly when it switches over from the open configuration to the closed configuration.

According to a second embodiment of the invention, the link member has a variable impedance and the value of the impedance in the first configuration of the link member is lower than that in the second configuration of the link member. This variable impedance is, for example, a variable resistance. The value of the impedance can vary linearly over all or part of the operating range of this impedance.

Increasing the value of the impedance of the link member in the second configuration enables the link member to oppose the exchange of current between the two circuits in the second configuration compared to what occurs in the first configuration. In the second configuration, the impedance thus constitutes an obstacle to the powering of the second electronic component by the first power source. Thus, the first circuit is hardly affected by the activation of the second electronic component.

The ratio between the impedance in the second configuration and the impedance in the first configuration can be equal to at least ten, being for example of the order of a few tens.

The link member may consist only of the above elements. The link member is, for example, a switch or a variable resistance.

The first and the second power sources can be energy storage units, notably batteries. Each of the power sources comprises, for example, a number of batteries in series and/or in parallel.

The first battery delivers, for example, a voltage of the order of 12 V and the second battery delivers, for example, a voltage of between 12 V and 30 V. More generally, the voltage delivered by the second battery can have the same value or a different value from that delivered by the first battery.

The control unit can be configured to control the activation and/or the deactivation of the second electronic component.

The control unit can be configured to detect the current configuration of the link member before activating the second electronic component and, when the link member is in the first configuration, control its changeover to the second configuration before activating the second electronic component or simultaneously with its activation.

The control unit can be centralized or formed from different distinct subunits, each of these subunits being dedicated to one or more tasks. The control unit comprises, for example, a microcontroller or any programmable circuit. The control unit comprises, for example, any logic circuit, analog or digital.

The first configuration of the link member may not be permitted when the second electronic component is activated. Thus, the allowing or not allowing of a greater or lesser exchange of current between the two circuits may depend on the activated or non-activated state of the second electronic component.

The network may comprise at least one alternator injecting electrical current into the network, when it is driven, to power the first and/or the second power source(s). The alternator may thus wholly or partly handle the recharging of the power sources of the network and/or the powering of the electronic components of the network.

The control unit may be configured to control the link member in such a way that, when the alternator is driven, the first and/or the second power source(s) is/are electrically powered.

The first configuration of the link member makes it possible, for example, to power the first power source and the second power source by the alternator. The control unit controls, for example, the alternator so that the latter injects current into the network and it controls the link member in the first configuration when the alternator is thus controlled.

If appropriate, when the alternator injects current into the network, the control unit can determine the current state of the second electronic component before deciding whether the link member must be controlled in the first configuration. When the second electronic component is activated, the link member may be controlled or maintained in the second configuration and, when the second electronic component is not activated, the link member may be controlled in the first configuration.

At least one of the power sources may be recharged by the alternator through the link member.

If appropriate, even when the link member is in the second configuration, a simultaneous recharging of the two power sources may be performed by the alternator but, in this case, the power source recharged through the link member may be recharged less effectively than the other power source.

The alternator may form part of the first circuit and electrically power, when it is driven, the second power source, at least when the link member is in the first configuration. In this case, the alternator electrically powers the first power source as soon as it is driven, independently of the configuration of the link member.

Independently, or in combination with the above examples, the network may comprise, in addition to the link member, a switch, and this switch and the alternator may be arranged in the network in such a way that the alternator is linked to the first power source or to the second power source depending on the position of the switch.

"Linked" means both "directly linked" in which case the alternator is connected to the terminals of one of the sources depending on the position of the switch and "indirectly linked", in which case an element may be mounted between one of the sources and the alternator.

When the switch links the alternator to one of the power sources, the other power source may nevertheless be recharged by the alternator through the link member.

The alternator may form part of the second circuit and power, when it is driven, the first power source, at least when the link member is in the first configuration. In this case, the alternator powers the second power source as soon as it is driven, independently of the configuration of the link member.

In all the above examples, the link member may be interposed between the first and the second circuits such that:
  at least one of the first and the second power sources is recharged through the link member, at least when it is in the first configuration,
  the exchange of current between the first and the second circuits is made more difficult when the link member is in the second configuration, notably when the second electronic component is activated, such that the portion of the power delivered by the first power source which is consumed by the second electronic component is reduced or even eliminated.

The control unit may synchronously control the second electronic component and the link member for the latter to be in the second configuration when the second electronic component is activated. The link member may be in the first configuration when the second electronic component is deactivated or may remain in the second configuration even when the second electronic component is not activated.

The activation of the second electronic component may or may not be permitted when the alternator is driven and is injecting electrical current into the network.

The link member may be configured to prevent the second power source from powering the first power source, at least when the link member is in the first configuration. There is thus an assurance that the power delivered by the second power source will be devoted to powering the second electronic component. To this end, the link member may comprise a one-way component, such as a diode for example.

The network may comprise a starter. The starter may form part of the first or the second network.

In an exemplary implementation of the invention, the first power source, the second power source, the starter and the link member are arranged in the network in such a way that, at least when the link member is in the first configuration, the starter is powered both by the first power source and by the second power source. In such a case, each power source supplies only a portion of the power consumed by the starter, which makes it possible to reduce the size of the power sources, the latter being dimensioned for the first cold start-up of the vehicle.

Yet another subject of the invention, according to another of its aspects, is a method for managing an electrical network of a vehicle, the network comprising:
  a first circuit comprising a first power source and at least one first electronic component powered by the first power source,
  a second circuit comprising a second power source and at least one second electronic component which can be activated and is powered by the second power source,
  a link member allowing, in a first configuration, an exchange of current of a first value between the first and the second circuits and, in a second configuration, an exchange of current of a second value between the first and the second circuits, the second value being lower than the first value, and
  a control unit controlling the configuration of the link member,
a method in which the control unit acts on the link member for the latter to reduce, or even prevent, the exchange of current between the first and the second circuits, at least when the second electronic component is activated.

The network may comprise an alternator injecting electrical current into the network when it is driven.

The control unit can control the activation and/or the deactivation of the second electronic component and the control of the activation, respectively of the deactivation, of the second electronic component can be synchronized with the control of the link member for the latter to be in the second, respectively first, configuration.

All or some of the features described above in relation to the aspect of the invention relating to the network also concern the aspect of the invention relating to the method.

The invention applies for example to motor vehicles.

Figure 2:
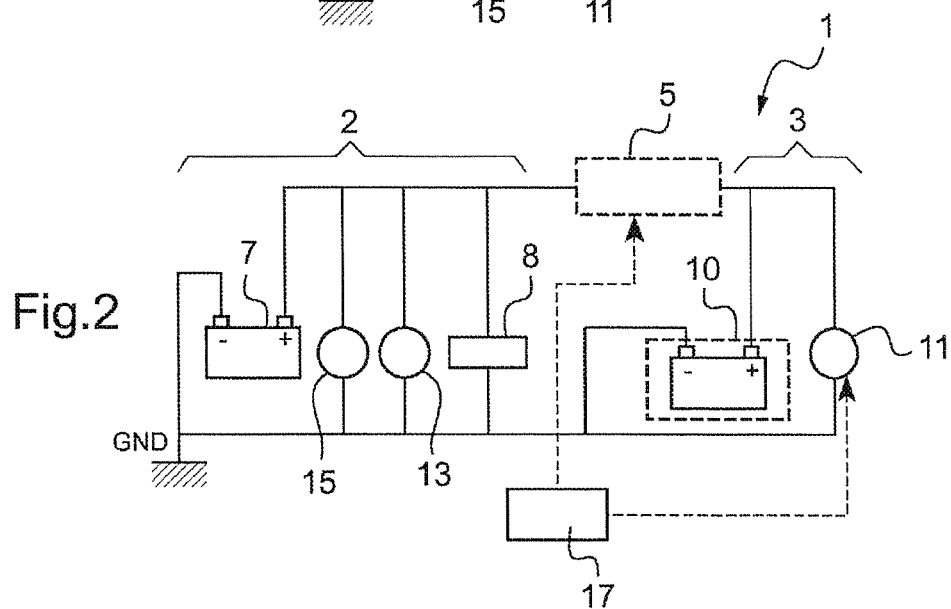

The invention will be able to be better understood on reading the following description of nonlimiting exemplary implementations thereof and on studying the attached drawing in which:

FIG. 1 represents an electrical network according to the prior art, already discussed, FIG. 2 represents an electrical network according to a first exemplary implementation of the invention, FIGS. 3 to 6 are exemplary embodiments of link members, and FIGS. 7 and 8 represent electrical networks according to other exemplary implementations of the invention.

FIG. 2 shows an electrical network 1 according to a first exemplary implementation of the invention. This network 1 comprises a first circuit 2 and a second circuit 3. In the example of FIG. 2, the first 2 and the second 3 circuits are linked together by a link member 5.

As represented in FIG. 2, the first circuit 2 comprises a first power source 7 powering first electronic components 8. In the example represented, the first electronic components 8 are mounted in parallel to the terminals of the first source 7. The electronic components 8 are, for example, comfort and/or safety components.

The second circuit 3 comprises a second power source 10 with a second electronic component 11 connected to its terminals. The second electronic component is, in the example considered, a compressor configured to deliver air into the intake line of a heat engine, this compressor notably backing up the turbocharger of the vehicle at low speed and during transient load increases.

The first source 7 and the second source 10 can be of the same type or of different types. When these sources are batteries, they can deliver different voltages and/or implement chemical reactions using different reagents.

The first source 7 delivers, for example, a DC voltage of 12 V whereas the second source 10 delivers a DC voltage of between 12 V and 30 V, for example 12 V.

In the example of FIG. 2, the first circuit 2 also comprises a starter 13 and an alternator 15, the starter 13 and the alternator 15 each being connected to the terminals of the first source 7.

The network 1 also comprises a control unit 17, preferably configured to act on the configuration of the link member 5 and to activate or not activate the second electronic component 11. The control unit 17 may be centralized or not and, for example, implements one or more microcontrollers. The operation of this control unit 17 will be described below.

As can be seen by comparing FIGS. 1 and 2, the invention makes it possible, unlike the network according to the prior art of FIG. 1, to have two circuits 2 and 3, such that the first electronic components 8 form part of the first circuit 2 and the second electronic component 11 forms part of the second circuit 3. The first electronic components 8 are powered by a source 7 whereas the second electronic component 11 is powered by another source 10. In the network 1 represented in FIG. 1, all the components form part of one and the same circuit and are powered by a single power source.

There now follows a description, with reference to FIGS. 3 to 6, of different examples of link member 5.

The link member 5 can assume at least two configurations. According to the first configuration, an exchange of current of a first value is possible between the first circuit 2 and the second circuit 3. According to a second configuration, a current of a second value, lower than the first value, is exchanged between the first circuit 2 and the second circuit 3.

Figure 3:
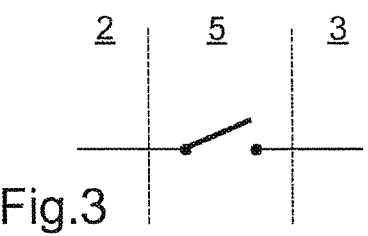

In the example of FIG. 3, the link member 5 is a switch, for example a mechanical switch such as a pushbutton, an electromechanical switch such as a relay or even an electronic switch such as a transistor.

In the example of FIG. 3, the switch is closed in the first configuration and open in the second configuration. In this case, the current exchanged between the first circuit 2 and the second circuit 3 is zero when the link member 5 is in the second configuration.

In another example which is not represented, the link member 5 is obtained using a switch with linear operation when it is closed.

Figure 4:
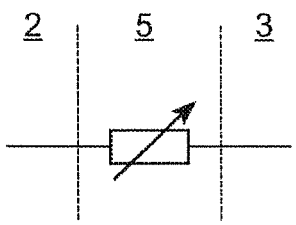

In the example of FIG. 4, the link member 5 is a variable resistor. A first value of this resistor gives the first configuration of the link member whereas a second value of this variable resistor 5, higher than the first value, gives the second configuration of the link member 5. The second value is, for example, ten times, notably twenty times, notably forty times, even a hundred times, greater than the first value. The first value is, for example, of the order of 0.5 mΩ and the second value is, for example, 20 mΩ. The current exchange when the link member is in the first configuration can be at least twice that exchanged when the link member is in the second configuration.

Thus, the second value of the variable resistor makes the exchange of current more difficult between the first 2 and the second 3 circuits through the link member 5.

Figure 5:
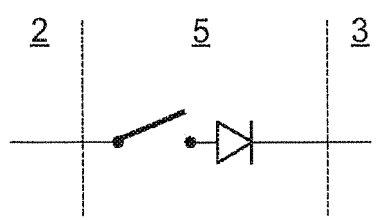
Figure 6:
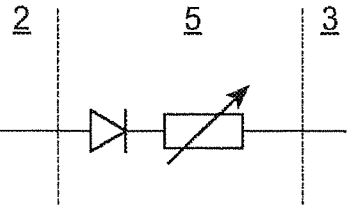

The link member can also allow the exchange of current only from the first 2 to the second 3 circuits, as illustrated in FIGS. 5 and 6 in which a one-way component, such as a diode, is added to the switch or to the variable resistor of FIGS. 3 and 4 to prevent the passage of the current from the second 3 to the first 2 circuits.

The operation of the network 1 according to this first exemplary implementation will now be described.

When the second electronic component 11 is not activated, only the first components 8, and possibly the starter 13, consume electrical power. In this case, the second electronic component 11 cannot disturb the network and the link member 5 can be in the first configuration in which an exchange of current is possible between the first circuit 2 and the second circuit 3.

The control unit 17 can determine that the second electronic component 11 must be activated. Such is notably the case in the example illustrated at low speed or in the event of a transient load increase. Before activating the second electronic component 11, the control unit can determine whether the link member 5 is in the second configuration in which it makes more difficult, even prevents, any exchange of current between the first circuit 2 and the second circuit 3. If not, the control unit 17 may first control the link member 5 for the latter to change over to the second configuration before activating the second electronic component 11. As a variant, simultaneously with the activation of the second electronic component 11, the control unit 17 causes the link member 5 to switch over to the second configuration.

When it is activated, the second electronic component 11 can thus be powered mainly, even only, by the second power source 10, depending on the value of the current exchanged between the first circuit 2 and the second circuit 3 in this second configuration of the link member 5. Thus, the voltage delivered by the first source 7 to the components 8 is affected little or not at all by the activation of the second electronic component 11.

When the alternator 15 is driven, the latter can inject current into the network 1. This injection of current by the alternator 15 can be detected by the control unit 17 and the latter can act on the link member 5 to allow one and/or the other of the sources 7 and 10 to be recharged by the alternator 15.

In the example of FIG. 2, the alternator recharges the first source 7 regardless of the configuration of the link member 5 and its capacity to recharge the second source 10 depends on the configuration of the link member 5. When the link member 5 is in the first configuration, a relatively high current can pass from the first circuit 2 to the second circuit 3, this current making it possible to recharge the second power source 10.

If the second electronic component 11 is activated while the alternator 15 is injecting current into the first circuit 2, the control unit 17 can cause the link member 5 to switch over to the second configuration. When the link member 5 is as represented in FIGS. 4 and 6, current injected by the alternator 15 can pass from the first circuit 2 to the second circuit 3 and this current, although it has a second value lower than the first value of the current which would be transmitted to the second circuit 3 if the link member 5 were in the first configuration, nevertheless makes it possible to recharge the second power source 10.

There now follows a description, with reference to FIG. 7, of a network 1 according to a second exemplary implementation of the invention. This network differs from the one described with reference to FIG. 2 by the fact that the alternator 15 and the starter 13 do not form part of the first circuit, but are segregated from the rest of the network 1 by a switch 20. This switch 20 can, as represented in FIG. 7, toggle between a position in which the alternator 15 and the starter 13 are mounted in parallel with the terminals of the first power source 7 and a second position in which the alternator 15 and the starter 13 are mounted in parallel with the terminals of the second power source 10. The position of the switch represented in FIG. 7 may make it possible to prioritize the recharging of one power source over another. The switch is, for example, controlled by the control unit 17.

When the switch is in one of the two above positions, the power source which does not have the alternator 15 and the starter 13 connected to its terminals is nevertheless linked to the alternator 15 and to the starter 13 via the link member 5.

In the example of FIG. 7, the link member 5 is a variable resistor.

When the switch 20 is in the position in which the starter 13 and the alternator 15 are mounted in parallel with the terminals of the second power source 10, contrary to the position represented in FIG. 7, the second circuit 3 is inserted between the first circuit 2 and the setup comprising two parallel branches, one of which is the alternator 15 and the other of which is the starter 13.

The network 1 can then operate as follows. On startup, the link member 5 can be in the first configuration, which enables the starter 13 to be powered by the second source 10 and, as much as possible, by the first source 7 through the link member 5.

After the startup and when the second electronic component 11 is not activated, the link member 5 can be kept in the first configuration, such that the first electronic components 8 can be powered by the first power source 7 and, as far as possible, by the second power source 10 through the link member 5.

When the second electronic component 11 is to be activated, the control unit 17 can control the changeover of the link member 5 to the second configuration. The resistance value is thus increased by a factor of the order of twenty, for example. In this second configuration, the voltage at the terminals of the first power source 7 varies only little. When the voltage initially delivered by the source 7 is 12 V, a voltage drop of 0.5 V can be measured for this source 7, because of the activation of the electronic component 11. When the voltage initially delivered by the second source 10 is 12 V, a voltage drop of between 1 and 1.5 V can be measured for this source 10, because of the activation of the second electronic component 11.

When the control unit 17 orders the alternator 15 to inject current into the network 1 and the second electronic component 11 is not activated, it can control the link member 5 for the latter to remain in or switch over to the first configuration, such that the second and the first power sources are recharged. The first electronic components 8 may also be powered by the alternator 15 in this case.

When the alternator 15 injects current into the network 1 and there is a desire to activate the second electronic component 11, the control unit 17 can control the link member 5 for the latter to switch over to the second configuration. The higher value of the variable resistor of the link member 15 makes it possible to reduce the value of the current passing through it, which reduces the Joules losses in this resistor. Furthermore, because of this reduced current value, the voltage drop on the voltage at the terminals of the first power source 7 is lower than if the link member 5 were in the first configuration.

The different elements of the network represented in FIG. 2 are, in a given example, dimensioned as follows. The first source 7 and the second source 10 are identical and deliver a voltage of 12 V with a capacity of 80 Ah. The link member 5 has a resistance of 0.5 mΩ in the first configuration and 20 mΩ in the second configuration. The switch 20 is dimensioned to transmit a maximum current of 100 A and withstands a maximum power of 5 W when it is in the position represented in FIG. 7 and it transmits a maximum current of 175 A and withstands a maximum power of 15 W when it is in the position corresponding to the cases that have just been described. The alternator 15 outputs a maximum current of 180 A into the network and delivers a maximum power of 2.5 kW.

There now follows a description, with reference to FIG. 8, of a network 1 according to a third exemplary implementation of the invention.

This example differs from those previously described by the fact that the starter 13 and the alternator 15 form part of the second circuit 3. The starter 13 and the alternator 15 are here each mounted in parallel with the terminals of the second source 10. The first circuit 2 and the second circuit 3 are segregated by the switch 20. The latter links the positive terminal of the second source 10:

to the positive terminal of the first source 7 via a one-way component such as a diode preventing the transfer of current from the first source 7 to the second source 10, in a first position of the switch, and, to the positive terminal of the first source 7 via the link member 5 in a second position of the switch.

The first position of the switch 20 is particularly suitable for allowing the activation of the second electronic component 11 while the alternator 15 is outputting into the network to recharge the sources 7 and 10. In such a case, no voltage drop is generated for the first source 7 because no current can pass through the resistor 5 of the link member and because the first source 7 does not power the second electronic component 11.

In the other cases, namely startup, post-startup phase with or without activation of the second electronic component, or recharging when the second electronic component is not activated, the switch 20 can be in the second position, that is to say that the link member 5 is inserted between the first circuit 2 and the second circuit 3.

The invention is not limited to the examples which have just been described.

The expression "comprising a" should be understood to mean "comprising at least one".

The invention claimed is:

1. An electrical network for a vehicle, comprising:
   a first circuit comprising a first power source and at least one first electronic component powered by the first power source;
   a second circuit comprising a second power source and at least one second electronic component which can be activated and is powered by the second power source;
   an alternator injecting electrical current into the network when it is driven to power the first and/or the second power source(s);
   a link member between the first and the second circuits, the link member allowing, in a first configuration, an exchange of current of a first value between the first and the second circuits and, in a second configuration, an exchange of current of a second value between the first and the second circuits, the second value being lower than the first value;
   a control unit controlling the configuration of the link member; and
   a switch, in addition to the link member, wherein the switch and the alternator are arranged in the network so that the alternator is linked to the first power source or to the second power source.

2. The network as claimed in claim 1, the ratio between the electrical power consumed by the second electronic component(s) and the electrical power consumed by the first electronic components) being between 1 and 5.

3. The network as claimed in claim 1, the power consumed by the second electronic component being greater than or equal to 1 kW.

4. The network as claimed in claim 1, the link member comprising a switch, wherein the switch is closed when the link member is in the first configuration and open when the link member is in the second configuration.

5. The network as claimed in claim 1, the link member having an impedance with a value that varies linearly, wherein the value of the impedance in the first configuration of the link member is lower than that in the second configuration of the link member.

6. The network as claimed in claim 5, the ratio between the impedance in the second configuration and the impedance in the first configuration being equal to at least ten.

7. The network as claimed in claim 1, wherein the first and the second power sources are batteries.

8. The network as claimed in claim 1, the control unit being configured to control the activation and/or the deactivation of the second electronic component.

9. The network as claimed in claim 8, the control unit being configured to detect the configuration of the link member before activating the second electronic component.

10. The network as claimed in claim 1, the control unit being configured to control the link member so that, when the alternator is driven, the first and/or the second power source(s) is/are electrically powered.

11. The network as claimed in claim 1, the first configuration of the link member making it possible to power the first power source and the second power source by the alternator.

12. The network as claimed in claim 11, the alternator forming part of the first circuit and electrically powering, when it is driven, the second power source, at least when the link member is in the first configuration.

13. The network as claimed in claim 11, the alternator forming part of the second circuit and powering, when it is driven, the first power source, at least when the link member is in the first configuration.

14. The network as claimed in claim 1, the link member being configured to prevent the second power source from powering the first power source, at least when the link member is in the first configuration.

15. The network as claimed in claim 1, the second electronic component being a compressor configured to deliver air into the intake line of a heat engine.

16. A method for managing an electrical network of a vehicle, the network comprising:
   a first circuit comprising a first power source and at least one first electronic component powered by the first power source,
   a second circuit comprising a second power source and at least one second electronic component which can be activated and is powered by the second power source,
   a link member allowing, in a first configuration, an exchange of current of a first value between the first and the second circuits and, in a second configuration, an exchange of current of a second value between the first and the second circuits, the second value being lower than the first value,
   a control unit controlling the configuration of the link member, and
   an alternator injecting electrical current into the network when it is driven to power the first and/or the second power source(s), the method comprising:
   reducing or preventing, by the control unit acting on the link member, the exchange of current between the first and the second circuits, at least when the second electronic component is activated,
   wherein the electrical network comprises a switch in addition to the link member, the switch and the alternator being arranged in the network so that the alternator is linked to the first power source or to the second power source depending on the position of the switch.

17. The method as claimed in claim 16,
controlling, by the control unit, the activation and/or the deactivation of the second electronic component wherein the control of the activation, and/or respectively of the deactivation, of the second electronic component is synchronized with the control of the link member for the latter to be in the second, and/or respectively first, configuration.

* * * * *